United States Patent
Tomik et al.

(10) Patent No.: US 10,322,708 B2
(45) Date of Patent: Jun. 18, 2019

(54) SYSTEM AND METHOD FOR CONTROLLING ALTERNATOR OR INTEGRATED STARTER GENERATOR OUTPUT VOLTAGE

(75) Inventors: Filip Tomik, Commerce Township, MI (US); Eric Michael Rademacher, Royal Oak, MI (US); Alexander O'Connor Gibson, Ann Arbor, MI (US); John Anthony DeMarco, Lake Orion, MI (US); Chad Everette Griffin, Pinckney, MI (US); Kirk Pebley, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1227 days.

(21) Appl. No.: 13/191,702

(22) Filed: Jul. 27, 2011

(65) Prior Publication Data

US 2013/0030670 A1   Jan. 31, 2013

(51) Int. Cl.
| | | |
|---|---|---|
| B60R 16/03 | (2006.01) | |
| B60W 10/06 | (2006.01) | |
| B60W 10/08 | (2006.01) | |
| B60W 20/00 | (2016.01) | |
| B60W 30/18 | (2012.01) | |
| F02N 11/08 | (2006.01) | |

(52) U.S. Cl.
CPC ............ B60W 10/06 (2013.01); B60R 16/03 (2013.01); B60W 10/08 (2013.01); B60W 20/00 (2013.01); B60W 30/18018 (2013.01); F02N 11/08 (2013.01); B60W 2520/10 (2013.01); B60W 2550/12 (2013.01); B60W 2710/08 (2013.01); Y02T 10/6286 (2013.01)

(58) Field of Classification Search
CPC .............. F02N 11/084; F02N 11/0837; F02N 11/0833; F02N 11/0803; F02N 11/0818; F02N 11/0814; F02N 11/08; B60W 2510/305; B60W 10/30; B60W 10/06; B60W 10/08; B60W 20/00; H02P 9/04; H02J 7/14–7/1492; F02D 41/042
USPC .............. 701/102, 112, 113, 114; 123/179.3, 123/179.4, 179.28; 322/26, 17, 44, 14, 322/22, 23, 24, 25, 27, 28
See application file for complete search history.

(56) References Cited

U.S. PATENT DOCUMENTS

| | | | | |
|---|---|---|---|---|
| 4,263,543 A | * | 4/1981 | Watrous | .................... H02J 7/16 219/202 |
| 4,376,909 A | * | 3/1983 | Tagami | ................ B60Q 1/1423 315/82 |
| 4,494,497 A | * | 1/1985 | Uchida | ................... F02D 17/04 123/179.4 |

(Continued)

FOREIGN PATENT DOCUMENTS

| | | |
|---|---|---|
| EP | 1503074 A1 | 2/2005 |
| JP | 59126044 A  *  7/1984 | ........... B60K 31/047 |

(Continued)

*Primary Examiner* — Sizo B Vilakazi
*Assistant Examiner* — Brian R Kirby
(74) *Attorney, Agent, or Firm* — Julia Voutyras; Brooks Kushman P.C.

(57) ABSTRACT

An automotive vehicle includes an engine, an alternator or integrated starter generator, and at least one controller. The at least one controller reduces voltage output of the alternator or integrated starter generator prior to initiating an auto stop of the engine.

4 Claims, 2 Drawing Sheets

(56) References Cited

U.S. PATENT DOCUMENTS

| | | | | |
|---|---|---|---|---|
| 4,613,791 A * | 9/1986 | Kurihara | ............... | B60Q 1/1423 307/10.8 |
| 4,689,545 A * | 8/1987 | Komurasaki | ............. | H02J 7/16 320/123 |
| 4,748,565 A * | 5/1988 | Toya | ........................ | F16H 59/70 324/161 |
| 4,825,139 A * | 4/1989 | Hamelin | ................ | H02J 7/1484 322/90 |
| 5,220,245 A * | 6/1993 | Honda | ................... | B60Q 1/143 307/10.8 |
| 5,451,820 A * | 9/1995 | Gotoh | ................ | B60K 31/0008 123/179.4 |
| 5,455,463 A | 10/1995 | Langnickel et al. | | |
| 5,719,485 A * | 2/1998 | Asada | ..................... | H02J 7/245 322/24 |
| 6,049,171 A * | 4/2000 | Stam | ....................... | B60Q 1/085 250/208.1 |
| 6,566,816 B2 * | 5/2003 | Fushimi | ............... | B60Q 1/1407 307/10.8 |
| 6,634,773 B2 * | 10/2003 | Hayami | ................. | B60Q 1/085 362/464 |
| 6,950,736 B2 * | 9/2005 | Cho | ........................ | F16H 61/12 475/131 |
| 7,458,353 B2 * | 12/2008 | Takahashi | ............... | F02D 17/04 123/179.3 |
| 7,692,412 B2 * | 4/2010 | Yamaguchi | ........... | H02J 7/1446 322/44 |
| 2006/0058897 A1 | 3/2006 | Senda et al. | | |
| 2007/0174001 A1 * | 7/2007 | Kjell | ........................ | B60T 8/172 701/55 |
| 2008/0205076 A1 * | 8/2008 | Taheri | ..................... | B60R 1/088 362/494 |
| 2009/0314561 A1 | 12/2009 | Handa | | |
| 2010/0164397 A1 * | 7/2010 | Shen | .................. | H05B 37/0272 315/291 |
| 2010/0269776 A1 * | 10/2010 | Mizuno | ................... | F02D 29/06 123/179.4 |

FOREIGN PATENT DOCUMENTS

| | | | |
|---|---|---|---|
| JP | 2001010405 A | * | 1/2001 |
| JP | 2005291158 A | * | 10/2005 |
| JP | 2006183546 A | * | 7/2006 |
| JP | 2012071782 A | * | 4/2012 |

* cited by examiner

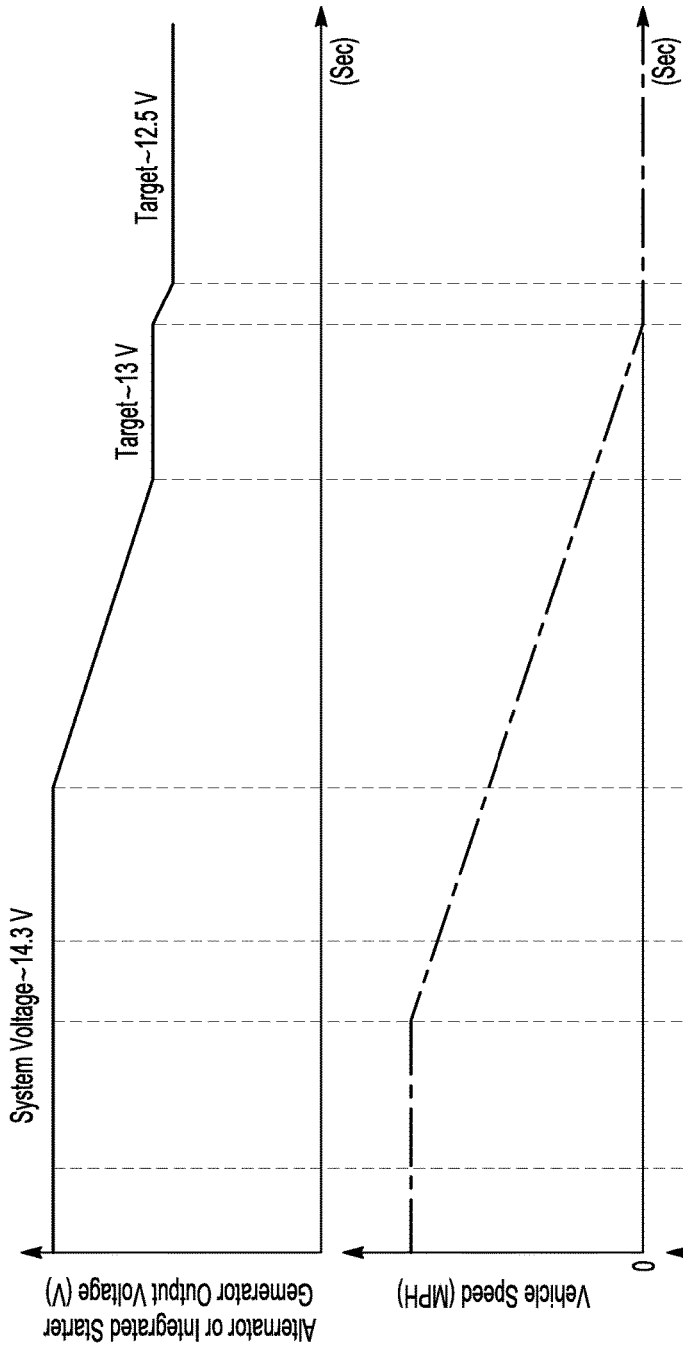

SYSTEM AND METHOD FOR CONTROLLING ALTERNATOR OR INTEGRATED STARTER GENERATOR OUTPUT VOLTAGE

TECHNICAL FIELD

This disclosure relates to strategies for controlling alternator or integrated starter generator output voltage prior to auto stopping an engine.

BACKGROUND

A micro-hybrid vehicle may automatically stop its internal combustion engine for a period of time during intervals of a drive cycle when vehicle speed approaches or is equal to 0. These engine auto stops may improve fuel economy by reducing engine idle time (and thus fuel consumption) for the drive cycle.

SUMMARY

An automotive vehicle may include an engine, an alternator or integrated starter generator, and at least one controller. The at least one controller may receive information about ambient light level and information about speed of the vehicle, and prior to initiating an auto stop of the engine, reduce voltage output of the alternator or integrated starter generator based on the received information.

A method for controlling output voltage of an alternator or integrated starter generator of a vehicle may include determining a threshold vehicle speed greater than 0, comparing speed of the vehicle to the threshold vehicle speed, and prior to initiating an engine auto stop, decreasing output voltage of the alternator or integrated starter generator if the speed of the vehicle is less than or equal to the threshold vehicle speed.

An automotive vehicle may include an engine, an alternator or integrated starter generator, and at least one controller. The at least one controller may reduce voltage output of the alternator or integrated starter generator prior to initiating an auto stop of the engine.

BRIEF DESCRIPTION OF THE DRAWINGS

FIG. 3 is a plot of alternator or integrated starter generator output voltage versus time.

FIG. 4 is a plot of vehicle speed versus time.

FIG. 5 is a plot of engine speed versus time.

DETAILED DESCRIPTION

Figure 1:
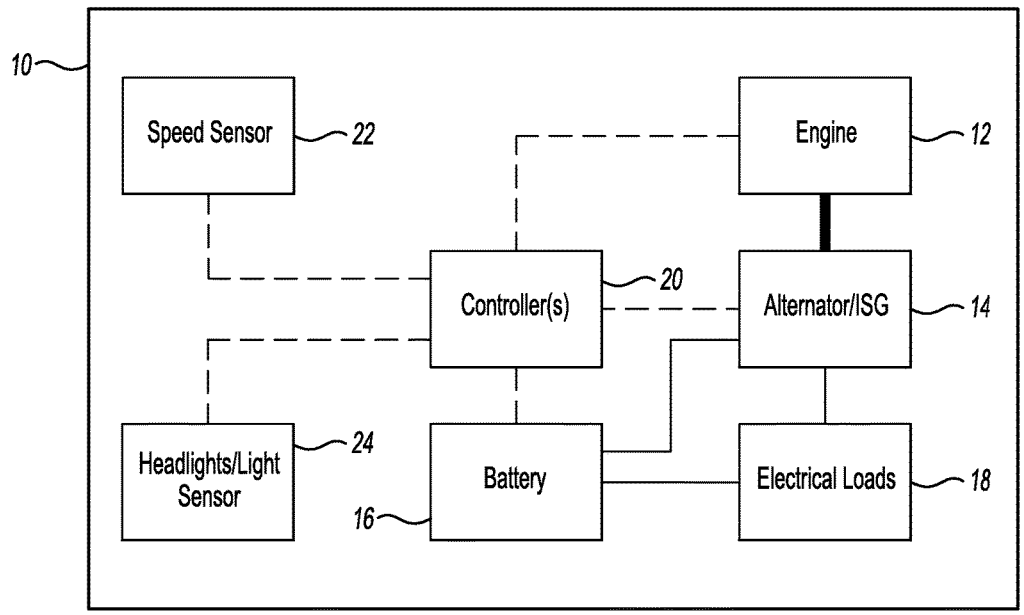
FIG. 1 is a block diagram of a micro-hybrid vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles equipped with an assisted direct start or stop/start system may shutdown the engine as the vehicle is coasting to a stop or after the vehicle comes to a stop. During engine shutdown, the maximum vehicle bus voltage decreases from the alternator or integrated starter generator output voltage (typically 14.5 volts at idle) to the battery voltage (typically 12.5 volts) if not supported by other means. If this 2 volt decrease in system voltage is applied to the headlights or other vehicle lights during engine shutdown, a noticeable reduction in the lighting output (measured in lumens) may be observed, particularly when the background or ambient lighting level is low. When the background or ambient lighting level is high, reductions in vehicle lighting output may go undetected.

A DC/DC converter connected between the battery and certain high priority (or base) electrical loads (e.g., radio) may be switched on during an engine auto stop to maintain or minimize the voltage decrease experienced by the selected base electrical loads. Vehicle lights, however, may not be designated as base electrical loads. Hence, an additional battery or capacitive device may be used to minimize or eliminate variation in lighting output during a stop/start shutdown and restart. Alternatively, a higher capacity DC/DC converter may be used to support both vehicle lighting and base electrical loads during a stop/start shutdown and restart. These arrangements, however, may increase stop/start system packaging volume and cost.

As mentioned above, vehicle lighting systems may be susceptible to perceived functional performance issues due to voltage variation/decrease during an auto stop event. Hence, alternator or integrated starter generator controls may be used to ramp down system voltage to a target voltage prior to engine shutdown to minimize perceived changes in lighting. Parameters such as the ramp rate, ramp duration, and target voltage may be calibrated in order to balance functionality, fuel economy and consistency with engine shutdown events.

Darkroom tests have shown that if the rate of change of the voltage applied to the lights can be reduced, the observed lighting output variation is less objectionable. It has also been determined, however, that under certain conditions (e.g., long pre-shutdown ramping periods) such voltage ramping can adversely impact the fuel economy gains associated with a stop/start vehicle. Stop/start pre-shutdown voltage ramping may thus be minimized or turned off if ambient light levels are high (e.g., if the headlights are off) as lighting output variation may go undetected. In one example, output from an ambient lighting sensor may be used as input to a ramping algorithm to either change the voltage ramp rate (e.g., the target volts/second rate used in the alternator or integrated starter generator voltage ramp down control) as a function of ambient light level or eliminate the voltage ramping if the ambient light levels exceed a predetermined threshold. Output from ambient light sensors may already be used to automatically turn on the headlights of certain vehicles. This output may also be used as input to an alternator or integrated starter generator voltage ramp down control.

Referring to FIG. 1, an automotive vehicle 10 may include an engine 12, an alternator or integrated starter generator 14, a battery 16, a plurality of electrical loads 18 (e.g., lighting system, etc.), and one or more controllers 20. The engine 12 generates motive power to move the vehicle 10 and mechanically drives the alternator or integrated starter generator 14. The alternator or integrated starter generator 14 and battery 16 are electrically connected with each other and the electrical loads 18. The engine 12, alternator or integrated starter generator 14 and battery 16 are in communication with and/or under the control of the controllers 20. Other arrangements, of course, are also possible. For example, the vehicle 10 may further include a traction battery and electric machine (not shown) arranged to selectively generate motive power to move the vehicle 10, etc.

The alternator or integrated starter generator 14 generates electric current to charge the battery 16 and for consumption by the electrical loads 18 when the engine 12 is running. The battery 16 may provide electric current for consumption by the electrical loads 18 when the engine 12 is not running. As explained above, the output voltage of the alternator or integrated starter generator 14 may be greater than the output voltage of the battery 16. To minimize instances of perceived changes in brightness of the lighting system 18, the controllers 20 may ramp down the output voltage of the alternator or integrated starter generator 14 prior to an auto stop of the engine 12 so that when a transition is made from the alternator or integrated starter generator 14 to the battery 16 as the source of electric current for consumption by the electrical loads 18, a change in system voltage is minimized.

A variety of parameters may be used to anticipate when the engine 12 may be auto stopped. In one example, the vehicle 10 further includes a speed sensor 22 and/or a headlights and/or ambient light sensor 24. Information from these and/or other sensors/data sources may be used as input to a look-up table stored in a memory associated with the controllers 20 to determine a threshold vehicle speed below which the controllers 20 begin to ramp down the output voltage of the alternator or integrated starter generator 14 to a target output voltage in anticipation of an impending engine auto stop. (The assumption being that once a speed of the vehicle 10 becomes less than the determined threshold speed, an engine auto stop is imminent.) Such a look-up table may be generated via testing, simulation, or any other suitable/known technique. Alternatively, the threshold speed may be determined computationally based on the input, etc.

Information from either/both of the sensors 22, 24 and/or other sensors/data sources may also be used to determine a ramp rate for the output voltage reduction, the target output voltage, and/or whether to preclude the ramping down of the output voltage of the alternator or integrated starter generator 14 (because of the potential adverse effect of such ramping on vehicle fuel economy). A look-up table or computational means, etc. may be employed for these purposes.

Figure 2:
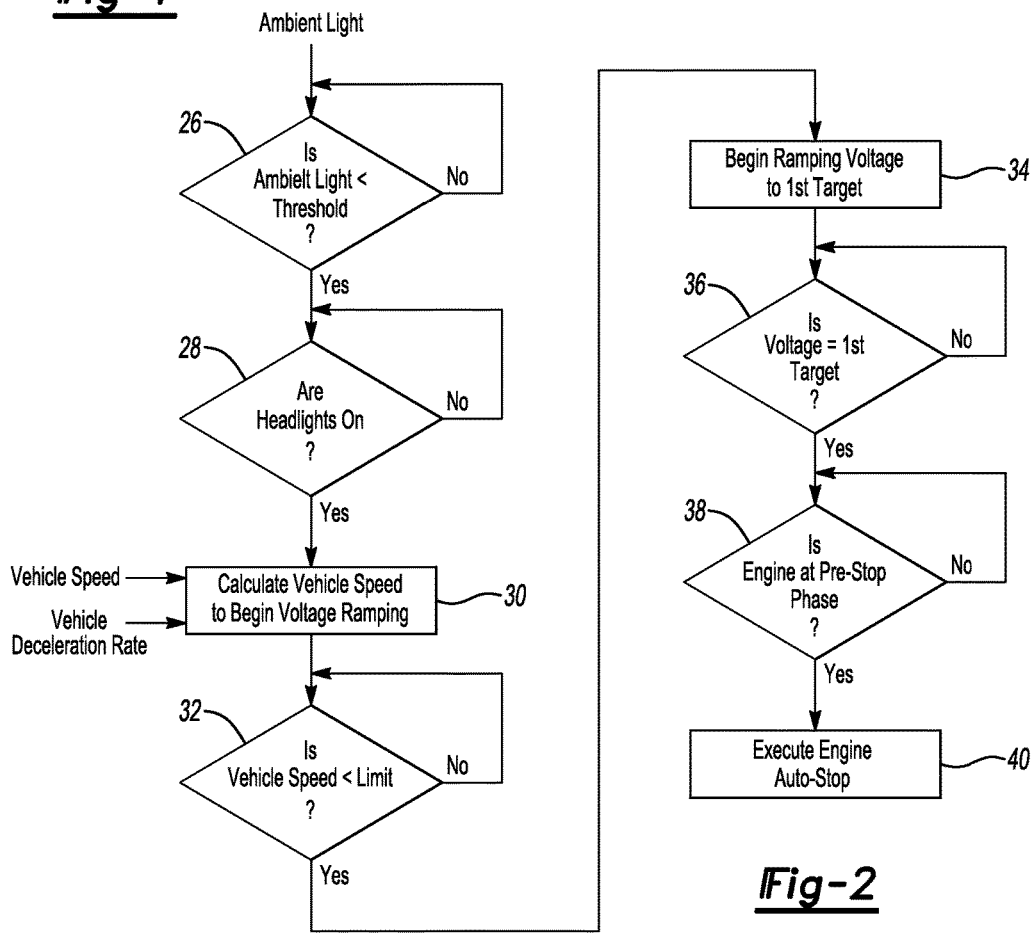
FIG. 2 is a flow chart illustrating an algorithm for controlling alternator or integrated starter generator output voltage.

Referring to FIG. 2, an algorithm for controlling alternator or integrated starter generator output voltage begins at operation 26. It is determined whether the ambient light level is less than a predetermined threshold. For example, the controllers 20 may determine whether ambient light levels are less than some threshold level (determined via testing for example) based on information from the sensor 24. If no, the algorithm returns to operation 26. If yes, it is determined whether the headlights are on at operation 28. If no the algorithm returns to operation 28.

If yes, the threshold speed to begin alternator or integrated starter generator output voltage ramping is determined at operation 30. The controllers 20, for example, may take as input vehicle speed and vehicle deceleration rate and use a look-up table or suitable computational technique to determine the threshold vehicle speed. Other such inputs may include, for example, traffic conditions (as determined via a navigation system) and road wetness (as determined via a wetness sensor or based on feedback from a traction control system), etc. In this example, as the deceleration rate increases, the threshold vehicle speed increases. Similarly, as the vehicle speed increases, the threshold vehicle speed increases. Other relationships, however, are also contemplated.

At operation 32, it is determined whether the vehicle speed is less than the threshold vehicle speed. The controllers 20, for example, may compare information from the sensor 22 with the threshold speed determined at operation 30. If no, the algorithm returns to operation 32. If yes, ramping down of the alternator or integrated starter generator output voltage to a target voltage is initiated at operation 34. For example, the controllers 20 may cause the output voltage of the alternator 14 to decrease by issuing a reduced set point voltage command to the alternator 14. A voltage regulator of the alternator 14 may then operate to reduce the field current associated with the alternator 14 accordingly.

At operation 36, it is determined whether the alternator or integrated starter generator output voltage is equal to the target voltage. The controllers 20 may compare, for example, the output voltage of the alternator or integrated starter generator 14 with the target voltage. If no, the algorithm returns to operation 36. If yes, it is determined whether the engine is at the pre-stop phase at operation 38. For example, the controllers 20 may determine whether the speed of the vehicle 10 is equal to 0. If so, the engine 12 is at the pre-stop phase. If no, the algorithm returns to operation 38. If yes, an engine auto stop is initiated at operation 40. The controllers 20 may, as known in the art, issue commands to prepare vehicle systems for the impending engine stop, to stop fuel flow to the engine 12, etc.

The example of FIG. 2 assumes that ambient light level and headlight status are used to determine whether to prevent/delay the ramping down of the alternator or integrated starter generator output voltage. In other examples, however, these parameters may not be so used. That is, certain algorithms may provide no provision for preventing/delaying the ramping down of the alternator or integrated starter generator output voltage. Likewise, the alternator or integrated starter generator output voltage need not be ramped to a target. Rather, the alternator or integrated starter generator output voltage may simply be reduced until the alternator or integrated starter generator is no longer the source of current for electrical loads. This scenario, however, may result in periods of unnecessary battery discharge once the alternator or integrated starter generator voltage becomes less than or equal to the battery output voltage. Other scenarios are also contemplated.

It should be apparent that the example algorithm of FIG. 2 does not preclude engine auto stops. Rather, the algorithm concerns whether output voltage ramping should be performed. If the algorithm remains at operation 28 because the headlights are off for example, the controllers 20 may, nevertheless, initiate an engine auto stop if the conditions for an auto stop are met (e.g., engine speed is approximately 0, etc.) Likewise, the controllers 20 may initiate an engine auto stop even if the algorithm remains at operation 26 because the ambient light level is greater than the predetermined threshold.

Referring to FIGS. 3, 4 and 5, alternator or integrated starter generator output voltage (e.g., 14.3 V), vehicle speed, and engine speed are relatively constant beginning at time t0. At time t1, the vehicle speed begins to decrease because, for example, a driver may take their foot off of the accelerator pedal and place it on the brake pedal. At time t2, the engine speed begins to decrease to its target idle speed in response to the vehicle speed decreasing. At time t3, the alternator or integrated starter generator output voltage begins to decrease because the vehicle speed becomes less than the threshold vehicle speed as discussed above. At time t4, the alternator or integrated starter generator output voltage reaches its first target voltage (e.g., 13 V). At time t5, the alternator or integrated starter generator output voltage begins to decrease from the first target voltage to a second target voltage (e.g., 12.5 V) approximately equal to the output voltage of the battery because the vehicle speed has reached 0. At time t6, the engine is stopped.

The time between t3 and t4 (e.g., 2 sec.) and corresponding first ramp rate, in this example, are fixed. Hence, the time period between t4 and t5 may vary as a function of the threshold vehicle speed. That is, the time period between t4 and t5 may increase as the threshold vehicle speed increases and vice versa. The first ramp rate, in this example, is fixed at a value that minimizes perceived changes in lighting output. The first target voltage is selected to be greater than the output voltage of the battery so as to avoid instances of battery discharge during the time period between t4 and t5. In scenarios lacking a target voltage, the alternator or integrated starter generator output voltage may continue to decrease until it is less than the battery output voltage, resulting in battery discharge. The time between t5 and t6, in this example, is shown to be at its minimum (e.g., ½ sec.) Hence, the corresponding second ramp rate is fixed at a value to allow the alternator or integrated starter generator output voltage to transition from the first target value to the second target value within this minimum time period.

The algorithms disclosed herein may be deliverable to/implemented by a processing device, such as the controllers 20, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a battery;
   an engine;
   an alternator; and
   a controller configured to,
   responsive to a command to autostop the engine, reduce voltage output of the alternator to a first target greater than an output voltage of the battery at a first rate that depends on ambient light level, and
   responsive to vehicle speed becoming zero, reduce the voltage output at a second rate different than the first rate and initiate the autostop.

2. The vehicle of claim 1 wherein the controller is further configured to reduce the voltage output of the alternator from the first target voltage to a second target voltage approximately equal to the voltage output of the battery.

3. A vehicle comprising:
   a battery;
   an engine;
   an integrated starter generator (ISG); and
   a controller configured to,
   responsive to a command to autostop the engine, reduce voltage output of the ISG to a first target greater than an output voltage of the battery at a first rate that depends on ambient light level, and
   responsive to vehicle speed becoming zero, reduce the voltage output at a second rate different than the first rate and initiate the autostop.

4. The vehicle of claim 3 wherein the controller is further configured to reduce the voltage output of the ISG from the first target voltage to a second target voltage approximately equal to the voltage output of the battery.

\* \* \* \* \*